United States Patent
Hahn et al.

(10) Patent No.: US 12,224,958 B2
(45) Date of Patent: Feb. 11, 2025

(54) METHOD AND APPARATUS FOR TRANSMITTING AND RECEIVING REFERENCE SIGNAL FOR SIDELINK COMMUNICATION

(71) Applicants: Hyundai Motor Company, Seoul (KR); Kia Motors Corporation, Seoul (KR); Wonkwang University Center For Industry-Academy Cooperation, Jeollabuk-do (KR)

(72) Inventors: Gene Back Hahn, Gyeonggi-do (KR); In Yong Jung, Gyeonggi-do (KR); Hyuk Min Son, Jeollabuk-do (KR)

(73) Assignees: Hyundai Motor Company, Seoul (KR); Kia Motors Corporation, Seoul (KR); Wonkwang University Center for Industry-Academy Cooperation, Jeollabuk-do (KR)

(*) Notice: Subject to any disclaimer, the term of this patent is extended or adjusted under 35 U.S.C. 154(b) by 431 days.

(21) Appl. No.: 17/276,651

(22) PCT Filed: Dec. 24, 2020

(86) PCT No.: PCT/KR2020/019147
§ 371 (c)(1),
(2) Date: Nov. 1, 2022

(87) PCT Pub. No.: WO2021/141306
PCT Pub. Date: Jul. 15, 2021

(65) Prior Publication Data
US 2023/0064036 A1    Mar. 2, 2023

Related U.S. Application Data

(60) Provisional application No. 62/958,464, filed on Jan. 8, 2020.

(51) Int. Cl.
*H04L 5/00* (2006.01)

(52) U.S. Cl.
CPC .................. *H04L 5/0051* (2013.01)

(58) Field of Classification Search
CPC ................................. H04L 5/0051
See application file for complete search history.

(56) References Cited

U.S. PATENT DOCUMENTS 10,448,365 B2   10/2019   Blasco Serrano et al.
11,418,992 B2*   8/2022   Nammi ............... H04B 17/318
(Continued)

FOREIGN PATENT DOCUMENTS

| EP | 4064598 A1 | 9/2022 |
| WO | 2015/122629 A1 | 8/2015 |
| WO | 2017/146779 A1 | 8/2017 |

OTHER PUBLICATIONS

"Discussion on physical layer structure for sidelink", R1-1911952, 3GPP TSG RAN WG1 #99, Reno, US, Nov. 18-22, 2019, Nokia, Nokia Shanghai Bell, 13 pages.

(Continued)

*Primary Examiner* — Fahmida S Chowdhury
(74) *Attorney, Agent, or Firm* — Fox Rothschild LLP

(57) ABSTRACT

A method and an apparatus for transmitting and receiving reference signals for sidelink communication are provided. The operation method of a first terminal includes receiving a message including a first DMRS scrambling identifier for sidelink communication from a base station and calculating a first DMRS sequence based on the first DMRS scrambling identifier. Additionally, the method includes transmitting SCI and a first DMRS generated based on the first DMRS sequence to a second terminal.

20 Claims, 5 Drawing Sheets

(56) References Cited

U.S. PATENT DOCUMENTS

| | | | | |
|---|---|---|---|---|
| 2013/0287064 A1* | 10/2013 | Seo | ................... | H04L 5/0051 |
| | | | | 375/144 |
| 2015/0326362 A1 | 11/2015 | Xiong et al. | | |
| 2016/0135240 A1* | 5/2016 | Yoon | ................... | H04W 8/005 |
| | | | | 370/329 |
| 2018/0062809 A1* | 3/2018 | Baghel | ................ | H04L 1/0061 |
| 2018/0367358 A1 | 12/2018 | Baligh et al. | | |
| 2019/0159181 A1* | 5/2019 | Manolakos | .......... | H04W 72/23 |
| 2019/0261324 A1* | 8/2019 | Nam | ................... | H04L 5/0048 |
| 2019/0268904 A1* | 8/2019 | Miao | .................... | H04W 52/02 |
| 2019/0357154 A1* | 11/2019 | Zeng | ................... | H04W 52/383 |
| 2020/0052939 A1* | 2/2020 | Xiong | ................... | H04L 5/001 |
| 2020/0127786 A1* | 4/2020 | Kwak | ................. | H04B 7/0417 |
| 2020/0145869 A1* | 5/2020 | Nammi | ............ | H04W 28/0215 |
| 2020/0205141 A1* | 6/2020 | Khoshnevisan | ...... | H04L 5/0055 |
| 2020/0336181 A1* | 10/2020 | Cao | ..................... | H04B 7/0626 |
| 2020/0367204 A1* | 11/2020 | Li | ........................ | H04W 72/02 |
| 2021/0219268 A1* | 7/2021 | Li | ........................ | H04B 17/318 |
| 2021/0266887 A1* | 8/2021 | Zhang | .................. | H04L 5/0053 |
| 2021/0385039 A1* | 12/2021 | Cha | ...................... | H04J 13/0029 |
| 2021/0400687 A1* | 12/2021 | Yeo | ....................... | H04L 1/0061 |

OTHER PUBLICATIONS

"PHY layer structure for NR sidelink", 3GPP TSG-RAN WG1 Meeting #99, Reno, NV, US, Nov. 18-22, 2019, Ericsson, R1-1912597, 33 pages.

3GPP TS 38.211, v15.7.0 (Sep. 2019) 3rd Generation Partnership Project; Technical Specification Group Radio Access Network; NR; Physical channels and modulation (Release 15), 97 pages.

* cited by examiner

[FIG. 1]
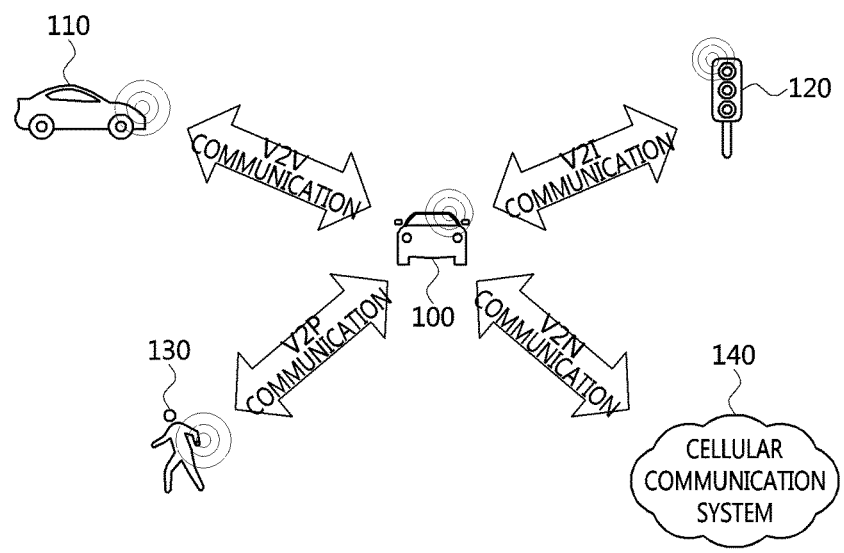

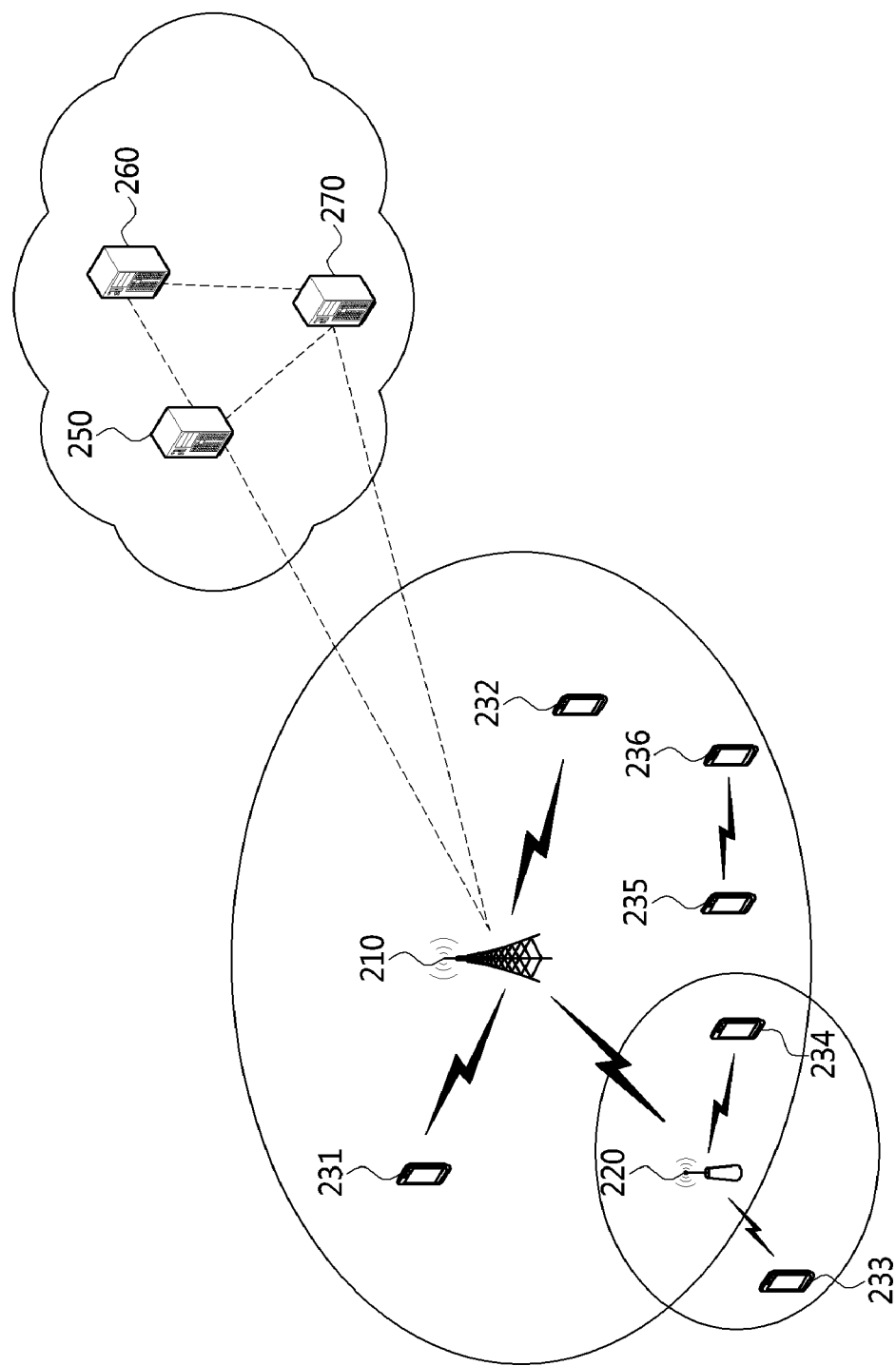
[FIG. 2]

【FIG. 3】
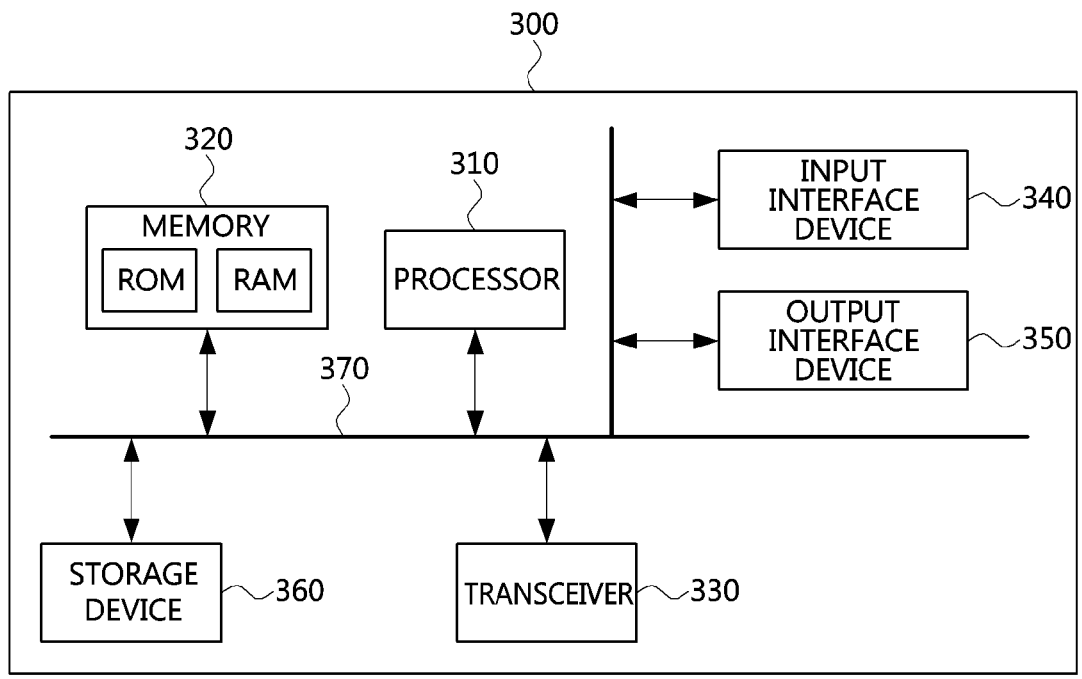
【FIG. 4】
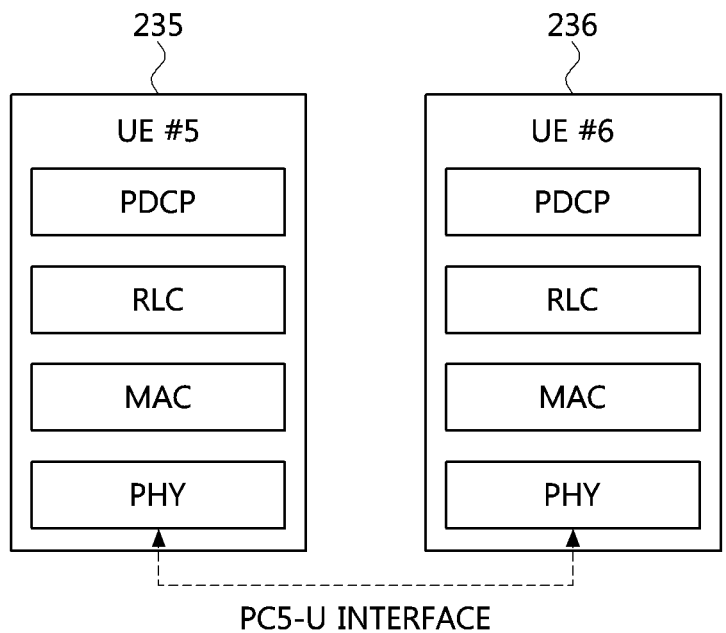

【FIG. 5】
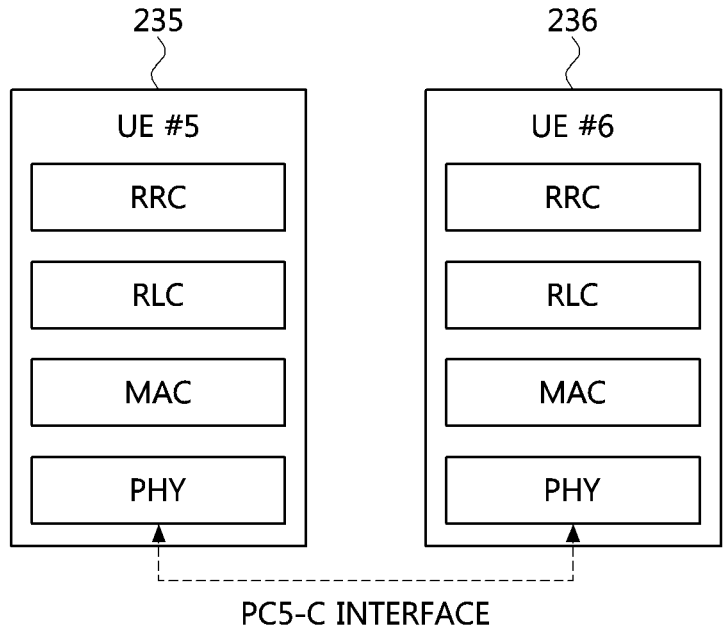
【FIG. 6】
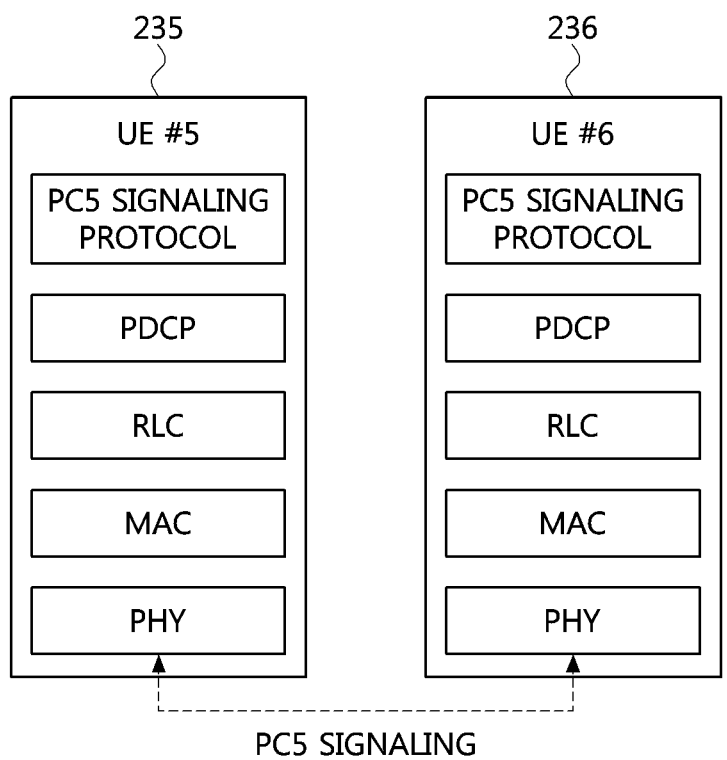

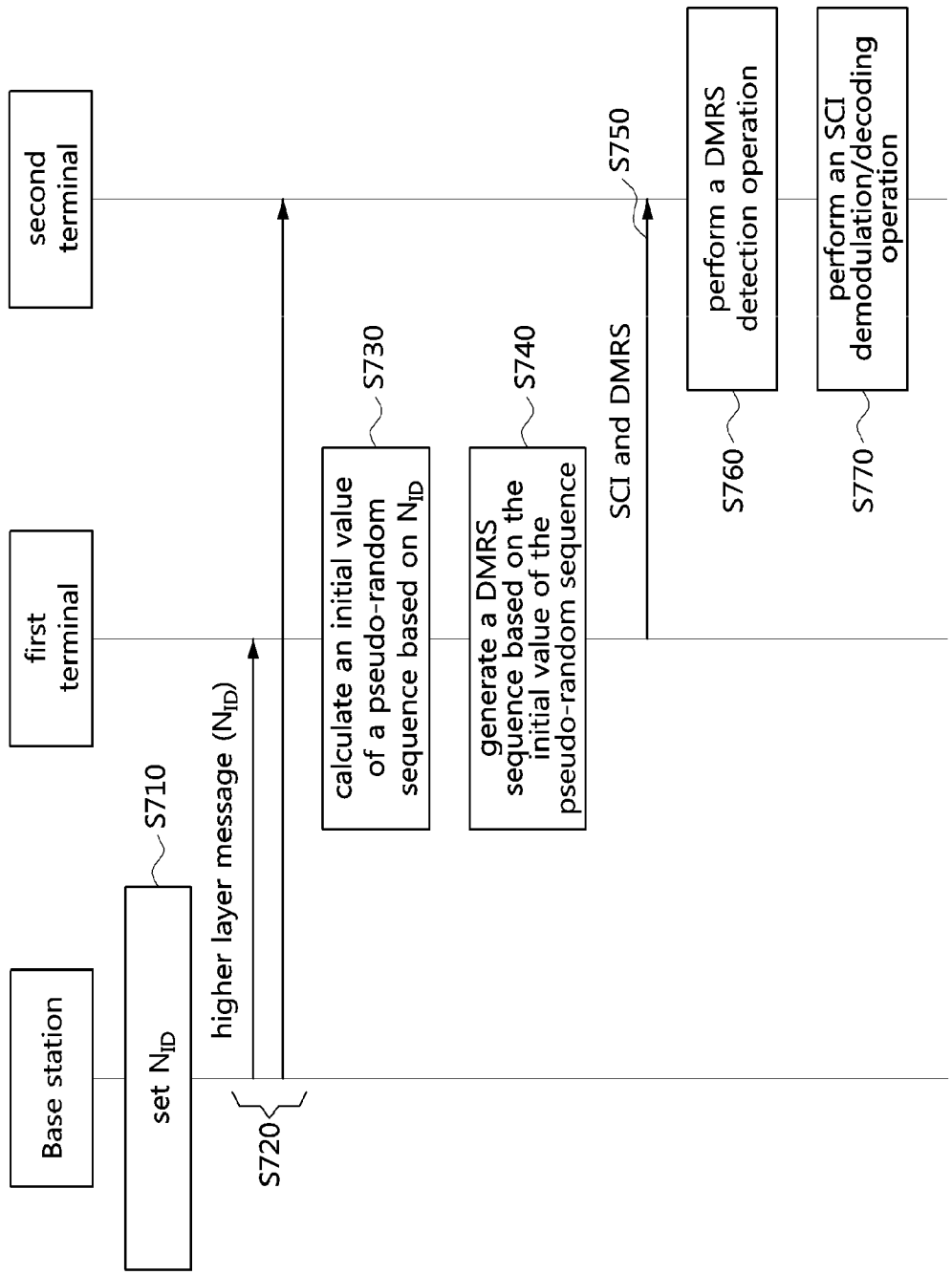
[FIG. 7]

METHOD AND APPARATUS FOR TRANSMITTING AND RECEIVING REFERENCE SIGNAL FOR SIDELINK COMMUNICATION

CROSS-REFERENCE TO RELATED APPLICATIONS

This application is a National Phase application filed under 35 USC 371 of PCT International Application No. PCT/KR2020/019147 with an International Filing Date of Dec. 24, 2020, which claims the benefit of U.S. Provisional Application 62/958,464 filed on Jan. 8, 2020. The entire contents of these applications are incorporated herein by reference in their entirety.

TECHNICAL FIELD

The present disclosure relates to a sidelink communication technique, and more specifically, to a technique for generating and transmitting reference signals for sidelink communication.

BACKGROUND

A fifth-generation (5G) communication system (e.g., New Radio (NR) communication. system) which uses a frequency band higher than a frequency band of a fourth-generation (4G) communication system (e.g., Long Term Evolution (LTE) communication system or LTE-Advanced (LTE-A) communication system) as well as the frequency band of the 4G communication system has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication systems, the V2X communications (e.g., C-V2X communications) may be performed based on "sidelink" communication technologies (e.g., Proximity-based Services (ProSe) communication technology, Device-to-Device (D2D) communication technology, or the like). For example, sidelink channels for vehicles participating in V2V communications can be established, and communications between the vehicles can be performed using the sidelink channels. The sidelink communication may be performed using configured grant (CG) resources. The CG resources may be configured periodically, and periodic data (e.g., periodic sidelink data) may be transmitted using the CG resources.

Meanwhile, a demodulation reference signal (DMRS) may be required in a procedure for transmitting sidelink control information and/or sidelink data. Since a method of generating a DMRS for sidelink communication is not defined, methods of generating and transmitting a DMRS are required.

SUMMARY

An objective of the present disclosure for solving the above-described problem is to provide a method for generating and transmitting a demodulation reference signal (DMRS) for sidelink communication in a communication system.

An operation method of a first communication node, according to a first exemplary embodiment of the present disclosure for achieving the objective, may comprise: receiving a message including a first demodulation reference signal (DMRS) scrambling identifier $N_{ID}$ for sidelink communication from a base station; calculating a first pseudo-random sequence $c_{init}$ by inputting the first DMRS scrambling identifier $N_{ID}$ into $c_{init}=(2^{17}(N_{symb}^{slot}n_{s,f}^{\mu}+l+1)(2N_{ID}+1)+2N_{ID}) \bmod 2^{31}$ (Equation 1); calculating a first DMRS sequence $r_l(m)$ by inputting the first pseudo-random sequence $c_{init}$ into $$r_l(m) = \frac{1}{\sqrt{2}}(1 - 2c(2\ m)) + j\frac{1}{\sqrt{2}}(1 - 2c(2\ m + 1));$$

and transmitting sidelink control information (SCI) and a first DMRS generated based on the first DMRS sequence $r_l(m)$ to a second terminal through a physical sidelink control channel (PSCCH), wherein $N_{symb}^{slot}$ denotes a number of symbols in a slot, $n_{s,f}^{\mu}$ denotes a slot number in a frame, and l denotes a symbol number in the slot.

The message may include an identifier list, the identifier list may include the first DMRS scrambling identifier and a second DMRS scrambling identifier, the first DMRS scrambling identifier may be used to generate the first DMRS sequence, and the second DMRS scrambling identifier may be used to generate a second DMRS sequence. An order of the DMRS scrambling identifiers included in the identifier list may be an order of using the DMRS scrambling identifiers.

The message may include an identifier list, the identifier list may include the first DMRS scrambling identifier and a second DMRS scrambling identifier, the first DMRS scrambling identifier may be used when a resource allocation (RA) scheme #1 is used for the sidelink communication, and the second DMRS scrambling identifier may be used when an RA scheme #2 is used for the sidelink communication.

The message may include an identifier list, the identifier list may include the first DMRS scrambling identifier, a second DMRS scrambling identifier, and a third DMRS scrambling identifier, the first DMRS scrambling identifier may be used when the sidelink communication is performed based on a cast type #1, the second DMRS scrambling identifier may be used when the sidelink communication is performed based on a cast type #2, the third DMRS scrambling identifier may be used when the sidelink communication is performed based on a cast type #3, and the case type #1, the cast type #2, and the cast type #3 may be broadcast, groupcast, and unicast, respectively.

The message may include an identifier list, the identifier list may include the first DMRS scrambling identifier and a second DMRS scrambling identifier, the first DMRS scrambling identifier may be used when a resource pool #1 is used for the sidelink communication, and the second DMRS scrambling identifier may be used when a resource pool #2 is used for the sidelink communication.

The message may further include information indicating a number of DMRS scrambling identifiers available for the resource pool #1 and information indicating a number of DMRS scrambling identifiers available for the resource pool #2. The message may further include a first cyclic shift value configured for the resource pool #1 and a second cyclic shift value configured for the resource pool #2. An additional DMRS sequence for the resource pool #1 may be generated by applying the first cyclic shift value to the first DMRS sequence.

An operation method of a second communication node, according to a second exemplary embodiment of the present disclosure for achieving the objective, may comprise: receiving a message including a first demodulation reference signal (DMRS) scrambling identifier for sidelink communication from a base station; performing a monitoring operation on a physical sidelink control channel (PSCCH) to obtain sidelink control information (SCI) from the first terminal; comparing a sequence of a reference signal detected on the PSCCH with a first DMRS sequence $r_l(m)$ generated based on the first DMRS scrambling identifier; and in response to determining that the sequence of the reference signal is equal to the first DMRS sequence $r_l(m)$, performing a reception operation of the SCI on the PSCCH, wherein the DMRS sequence $r_l(m)$ is generated based on $$r_l(m) = \frac{1}{\sqrt{2}}(1 - 2c(2\ m)) + j\frac{1}{\sqrt{2}}(1 - 2c(2\ m + 1)),$$

an initialization value $c_{init}$ of $c(\cdot)$ is generated based on $c_{init}=(2^{17}(N_{symb}^{slot}n_{s,f}^{\mu}+l+1)(2N_{ID}+1)+2N_{ID}) \bmod 2^{31}$, $N_{ID}$ denotes the first DMRS scrambling identifier, $N_{symb}^{slot}$ denotes a number of symbols in a slot, $n_{s,f}^{\mu}$ denotes a slot number in a frame, and l denotes a symbol number in the slot.

The message may include an identifier list, the identifier list may include the first DMRS scrambling identifier and a second DMRS scrambling identifier, the first DMRS scrambling identifier may be used to generate the first DMRS sequence, and the second DMRS scrambling identifier may be used to generate a second DMRS sequence. In response to determining that first DMRS scrambling identifier is configured for a resource allocation (RA) scheme #1 among the RA scheme #1 and an RA scheme #2, and the first DMRS sequence $r_l(m)$ generated based on the first DMRS scrambling identifier is equal to the sequence of the reference signal, the RA scheme #1 may be determined to be used for the sidelink communication.

In response to determining that first DMRS scrambling identifier is configured for a cast type #1 among the cast type #1, a cast type #2, and a cast type #3, and the first DMRS sequence $r_l(m)$ generated based on the first DMRS scrambling identifier is equal to the sequence of the reference signal, the sidelink communication may be determined to be performed based on the cast type #1, and the case type #1, the cast type #2, and the cast type #3 may be broadcast, groupcast, and unicast, respectively.

In response to determining that first DMRS scrambling identifier is configured for a resource pool #1 among the resource pool #1 and a resource pool #2, and the first DMRS sequence $r_l(m)$ generated based on the first DMRS scrambling identifier is equal to the sequence of the reference signal, the sidelink communication may be determined to be performed using the resource pool #1. The message may further include information indicating a number of DMRS scrambling identifiers available for the resource pool #1 and information indicating a number of DMRS scrambling identifiers available for the resource pool #2.

A first terminal, according to the first exemplary embodiment of the present disclosure for achieving the objective, may comprise a processor; and a memory storing at least one instruction executable by the processor, wherein the at least one instruction causes the first terminal to: receive a message including a first demodulation reference signal (DMRS) scrambling identifier $N_{ID}$ for sidelink communication from a base station; calculate a first pseudo-random sequence $c_{init}$ by inputting the first DMRS scrambling identifier $N_{ID}$ into $c_{init}=(2^{17}(N_{symb}^{slot}n_{s,f}^{\mu}+l+1)(2N_{ID}+1)+2N_{ID}) \bmod 2^{31}$; calculate a first DMRS sequence $r_l(m)$ by inputting the first pseudo-random sequence $c_{init}$ into $$r_l(m) = \frac{1}{\sqrt{2}}(1 - 2c(2\ m)) + j\frac{1}{\sqrt{2}}(1 - 2c(2\ m + 1)); \qquad \text{(Equation 2)}$$

and transmit sidelink control information (SCI) and a first DMRS generated based on the first DMRS sequence $r_l(m)$ to a second terminal through a physical sidelink control channel (PSCCH), wherein $N_{symb}^{slot}$ denotes a number of symbols in a slot, $n_{s,f}^{\mu}$ denotes a slot number in a frame, and l denotes a symbol number in the slot.

The message may include an identifier list, the identifier list may include the first DMRS scrambling identifier and a second DMRS scrambling identifier, the first DMRS scrambling identifier may be used to generate the first DMRS sequence, and the second DMRS scrambling identifier may be used to generate a second DMRS sequence. The message may include an identifier list, the identifier list may include the first DMRS scrambling identifier and a second DMRS scrambling identifier, the first DMRS scrambling identifier may be used when a resource allocation (RA) scheme #1 is used for the sidelink communication, and the second DMRS scrambling identifier may be used when an RA scheme #2 is used for the sidelink communication.

The message may include an identifier list, the identifier list may include the first DMRS scrambling identifier, a second DMRS scrambling identifier, and a third DMRS scrambling identifier, the first DMRS scrambling identifier may be used when the sidelink communication is performed based on a cast type #1, the second DMRS scrambling identifier may be used when the sidelink communication is performed based on a cast type #2, the third DMRS scrambling identifier may be used when the sidelink communication is performed based on a cast type #3, and the case type #1, the cast type #2, and the cast type #3 may be broadcast, groupcast, and unicast, respectively.

The message may include an identifier list, the identifier list may include the first DMRS scrambling identifier and a second DMRS scrambling identifier, the first DMRS scrambling identifier may be used when a resource pool #1 is used for the sidelink communication, and the second DMRS scrambling identifier may be used when a resource pool #2 is used for the sidelink communication.

According to the present disclosure, a first terminal may generate a DMRS sequence using a demodulation reference signal (DMRS) scrambling identifier obtained from a base station or a DMRS scrambling identifier determined by the first terminal. The first terminal may transmit sidelink control information (SCI) and the DMRS (e.g., DMRS sequence) to a second terminal on a physical sidelink control channel (PSCCH). In other words, since the DMRS is used in the SCI transmission procedure, the SCI can be efficiently transmitted and received. Therefore, the performance of the communication system can be improved.

DESCRIPTION OF DRAWINGS

FIG. 1 is a conceptual diagram illustrating V2X communication scenarios.

FIG. 2 is a conceptual diagram illustrating an exemplary embodiment of a cellular communication system.

FIG. 3 is a conceptual diagram illustrating an exemplary embodiment of a communication node constituting a cellular communication system.

FIG. 4 is a block diagram illustrating an exemplary embodiment of a user plane protocol stack of a UE performing sidelink communication.

FIG. 5 is a block diagram illustrating a first exemplary embodiment of a control plane protocol stack of a UE performing sidelink communication.

FIG. 6 is a block diagram illustrating a second exemplary embodiment of a control plane protocol stack of a UE performing sidelink communication.

FIG. 7 is a sequence chart illustrating a first exemplary embodiment of a sidelink communication method using an SL DMRS.

DETAILED DESCRIPTION

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all teens (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, preferred exemplary embodiments of the present invention will be described in detail with reference to the accompanying drawings. In describing the present invention, to facilitate the entire understanding, like numbers refer to like elements through out the description of the figures and the repetitive description thereof will be omitted.

FIG. 1 is a conceptual diagram illustrating V2X communication scenarios. As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 via the V2V communications. For example, autonomous driving (e.g., platooning) may be supported based on the driving information exchanged via the V2V communications. The V2V communications supported in the cellular communication system 140 may be performed based on "sidelink" communication technologies (e.g., ProSe and D2D communication technologies, and the like). In particular, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 via the V2I communications. The V2I communications supported in the cellular communication system 140 may also be performed based on sidelink communication technologies (e.g., ProSe and D2D communication technologies, and the like). In particular, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 via the V2P communications. The communication node located in the vehicle 100 or the communication node carried by the person 130 may be configured to generate an alarm that indicates a danger by detecting a dangerous situation based on the obtained driving information and movement information. The V2P communications supported in the cellular communication system 140 may be performed based on sidelink communication technologies (e.g., ProSe and D2D communication technologies, and the like). In particular, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected through the cellular communication system 140. The V2N communications may be performed based on the 4G communication technology (e.g., LTE or LIE-A) or the 5G communication technology (e.g., NR). Additionally, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows. FIG. 2 is a conceptual diagram illustrating an exemplary embodiment of a cellular communication system. As shown in FIG. 2, a cellular communication system may include an access network, a core network, and the like. The access network may include a base station 210, a relay 220, User Equipments (UEs) 231 through 236, and the like. The UEs 231 through 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, or the core network constituted by the UPF 250, the SMF 260, and the AMF 270 may support the 4G communication technology as well as the 5G communication technology.

Additionally, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) comprising the cellular communication system may be configured to perform communications using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) comprising the cellular communication system may be configured as follows. FIG. 3 is a conceptual diagram illustrating an exemplary embodiment of a communication node constituting a cellular communication system. As shown in FIG. 3, a communication node 300 may comprise at least one processor 310, a memory 320, and a transceiver 330 connected to a network for performing communications. Additionally, the communication node 300 may further comprise an input interface device 340, an output interface device 350, a storage device 360, and the like. Each component included in the communication node 300 may be configured to communicate with each other as connected via a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may be configured to execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may comprise at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may be configured to transmit signals received from the core network to the UEs 231 through 236 and the relay 220, and may be configured to transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may be configured to communicate with the base station 210 after being connected to the base station 210.

The relay 220 may be connected to the base station 210 and may be configured to relay communications between the base station 210 and the UEs 233 and 234. In other words, the relay 220 may be configured to transmit signals received from the base station 210 to the UEs 233 and 234, and transmit signals received from the UEs 233 and 234 to the base station 210. The UE 234 may belong to both of the cell coverage of the base station 210 and the cell coverage of the relay 220, and the UE 233 may belong to the cell coverage of the relay 220. In other words, the UE 233 may be located outside the cell coverage of the base station 210. The UEs 233 and 234 may be connected to the relay 220 by performing a connection establishment procedure with the relay 220. The UEs 233 and 234 may be configured to communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may be configured to perform operations corresponding to the base station 210 and operations supported by the base station 210. The UEs 233 and 234 may be configured to perform operations corresponding to the relays 220 and operations supported by the relays 220.

Particularly, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
| --- | --- | --- |
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows. FIG. 4 is a block diagram illustrating an exemplary embodiment of a user plane protocol stack of a UE performing sidelink communication. As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may comprise a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications and the layer 2-ID may be an ID configured for the V2X communications (e.g., V2X service). Additionally, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows. FIG. 5 is a block diagram illustrating a first exemplary embodiment of a control plane protocol stack of a UE performing sidelink communication, and FIG. 6 is a block diagram illustrating a second exemplary embodiment of a control plane protocol stack of a UE performing sidelink communication.

As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Additionally, a demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

Meanwhile, a sidelink transmission mode (TM) may be classified into sidelink TMs 1 to 4 as shown below in Table 2.

TABLE 2

| Sidelink TM | Description |
| --- | --- |
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM3 or 4 is supported, each of the UEs 235 and 236 may be configured to perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In particular, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. Particularly, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In particular, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. The sidelink data may be transmitted and received via resources selected autonomously by the UE (e.g., UE 235 or 236) within the resource pool configured by the dedicated RRC signaling procedure or the broadcast RRC signaling procedure.

Hereinafter, methods for transmitting and receiving hybrid automatic repeat request (HARQ) responses for sidelink data (e.g., transport block (TB), code block group (CBG)) will be described. In the exemplary embodiments, an HARQ response may be referred to as 'HARQ-acknowledgement (HARQ-ACK)'. The HARQ response may be ACK or negative ACK (NACK). Even when a method (e.g., transmission or reception of a signal) to be performed at a first communication node among communication nodes is described, a corresponding second communication node may perform a method (e.g., reception or transmission of the signal) corresponding to the method performed at the first communication node. In other words, when an operation of a UE #1 (e.g., vehicle #1) is described, a UE #2 (e.g., vehicle #2) corresponding thereto may perform an operation corresponding to the operation of the UE #1. Conversely, when an operation of the UE #2 is described, the corresponding UE #1 may perform an operation corresponding to the operation of the UE #2. In exemplary embodiments described below, an operation of a vehicle may be an operation of a communication node located in the vehicle.

In exemplary embodiments, signaling may be one or a combination of two or more of higher layer signaling, MAC signaling, and physical (PHY) signaling. A message used for the higher layer signaling may be referred to as a 'higher layer message' or a 'higher layer signaling message'. A message used for the MAC signaling may be referred to as a 'MAC message' or a 'MAC signaling message'. A message used for the PHY signaling may be referred to as a 'PHY message' or a 'PHY signaling message'. The higher layer signaling may refer to an operation of transmitting and receiving system information (e.g., master information block (MIB), system information block (SIB)) and/or an RRC message. The MAC signaling may refer to an operation of transmitting and receiving a MAC control element (CE). The PHY signaling may refer to an operation of transmitting and receiving control information (e.g., downlink control information (DCI), uplink control information (UCI), SCI).

A sidelink signal may be a synchronization signal and a reference signal used for sidelink communication. For example, the synchronization signal may be a synchronization signal/physical broadcast channel (SS/PBCH) block, sidelink synchronization signal (SLSS), primary sidelink synchronization signal (PSSS), secondary sidelink synchronization signal (SSSS), or the like. The reference signal may be a channel state information-reference signal (CSI-RS), DM-RS, phase tracking-reference signal (PT-RS), cell specific reference signal (CRS), sounding reference signal (SRS), discovery reference signal (DRS), or the like.

A sidelink channel may be a PSSCH, PSCCH, PSDCH, PSBCH, physical sidelink feedback channel (PSFCH), or the like. In addition, a sidelink channel may refer to a sidelink channel including a sidelink signal mapped to specific resources in the corresponding sidelink channel. The sidelink communication may support a broadcast service, a multi cast service, a groupcast service, and a unicast service.

The sidelink communication may be performed based on a single SCI scheme or a multi SCI scheme. When the single SCI scheme is used, data transmission (e.g., sidelink data transmission, sidelink-shared channel (SL-SCH) transmission) may be performed based on a single SCI (e.g., 1st-stage SCI). When the multi SCI scheme is used, data transmission may be performed using two SCIs (e.g., 1st-stage SCI and 2nd-stage SCI). The SCI may be transmitted through a PSCCH and/or a PSSCH. When the single SCI scheme is used, the SCI (e.g., 1st-stage SCI) may be transmitted via a PSCCH. When the multi SCI scheme is used, the 1st-stage SCI may be transmitted via a PSCCH, and the 2nd-stage SCI may be transmitted via a PSCCH or a PSSCH. The 1st-stage SCI may be referred to as a 'first stage SCI', and the 2nd-stage SCI may be referred to as a 'second stage SCI'.

The first stage SCI may include one or more information elements among priority information, frequency resource assignment information, time resource assignment information, resource reservation period information, DMRS pattern information, second stage SCI format information, beta_offset indicator, number of DMRS ports, and modulation and coding scheme (MCS) information. The second stage SCI may include one or more information elements among a HARQ process identifier (ID), redundancy version (RV), source ID, destination ID, CSI request information, zone ID, and communication range requirement.

Meanwhile, reference signals may be used for sidelink communication. Reference signals for sidelink communication may include DMRS, PT-RS, CSI-RS, and the like. The DMRS may be used for transmission and reception of SCI and/or sidelink data. For example, SCI and DMRS may be transmitted on a PSCCH. The DMRS transmitted on the PSCCH may be used in a procedure for transmitting and receiving the SCI. In exemplary embodiments, the DMRS transmitted on the PSCCH may be referred to as 'PSCCH DMRS'. The sidelink data and DMRS may be transmitted on a PSSCH. The DMRS transmitted on the PSSCH may be used in a procedure for transmitting and receiving the sidelink data. In exemplary embodiments, the DMRS transmitted on the PSSCH may be referred to as 'PSSCH DMRS'. In the following, methods of generating and transmitting sidelink (SL) DMRS (e.g., PSCCH DMRS, PSSCH DMRS) will be described.

FIG. 7 is a sequence chart illustrating a first exemplary embodiment of a sidelink communication method using an SL DMRS. As shown in FIG. 7, a communication system may include a base station, a first terminal, and a second terminal. The base station may be the base station 210 shown in FIG. 2, the first terminal may be the UE #5 235 shown in FIG. 2, and the second terminal may be the UE #6 236 shown in FIG. 2. Each of the base station, the first terminal, and the second terminal may be configured identically or similarly to the communication node 300 shown in FIG. 3. The first terminal and the second terminal may support the protocol stack(s) shown in FIGS. 4 to 6.

The base station may configure $N_{ID}$ for initialization of a pseudo-random sequence used for generating a DMRS sequence (S710). The Na may be set to an arbitrary value(s). For example, the $N_{ID}$ may be set to one or more value(s) of $\{0, 1, \ldots, 65535\}$. The $N_{ID}$ may be referred to as 'sl-DMRS-ScrambleID'. In other words, the $N_{ID}$ may be referred to as a DMRS scrambling identifier. The base station may inform the terminal(s) (e.g., the first terminal and/or the second terminal) of the $N_{ID}$ using one or a combination of two or more among higher layer signaling, MAC signaling, and PHY signaling (S720). For example, sl-DMRS-ScrambleID (e.g., $N_{ID}$) may be included in SL-PSCCH-Config (e.g., SL-PSCCH-configuration information), and the base station may transmit SL-ResourcePool (e.g., SL-resource pool configuration information) including SL-PSCCH-Config to the terminal(s) (e.g., the first terminal and/or the second terminal) using higher layer signaling.

The terminal(s) may be configured to obtain the $N_{ID}$ from the base station through higher layer signaling. In addition, the terminal(s) may be configured to generate one or more additional $N_{ID}(s)$ based on the $N_{ID}$ obtained from the base station. Alternatively, in the step S720, instead of the $N_{ID}$, configuration information used for determining $N_{ID}$ may be received. In particular, the terminal(s) may be configured to determine $N_{ID}$ based on the configuration information received from the base station. The steps S710 and S720 may be performed based on various schemes.

Scheme #1 (S710/S720)

$N_{ID}$ (e.g., DMRS scrambling identifier) for a PSCCH DMRS may be set to a fixed value. In this case, the base station may configure $N_{ID}$ having a fixed value to the terminal(s) using one or a combination of two or more among MIB, SIB, RRC message, and MAC-CE. The $N_{ID}$ may be configured as shown in Table 3 below.

TABLE 3

| | $N_{ID}$ value |
| --- | --- |
| $N_{ID}$ #1 | First value |
| $N_{ID}$ #2 | Second value |
| $N_{ID}$ #3 | Third value |
| $N_{ID}$ #4 | Fourth value |

The base station may configure one or more $N_{ID}(s)$. For example, the base station may configure four $N_{ID}(s)$ (e.g., $N_{ID}$ #1 to $N_{ID}$ #4), and may transmit an $N_{ID}$ list including one or more $N_{ID}(s)$ to the terminal(s) by using higher layer signaling. When one terminal generates two or more DMRS sequences, the order of the $N_{ID}(s)$ included in the $N_{ID}$ list may refer to the order of using the $N_{ID}(s)$ in the corresponding terminal. For example, when the $N_{ID}$ list is set to $\{N_{ID}$ #1, $N_{ID}$ #2$\}$, the terminal (e.g., the first terminal or the second terminal) may be configured to generate a DMRS sequence using $N_{ID}$ #1, and then, may be configured to generate a DMRS sequence using $N_{ID}$ #2. Alternatively, the terminal (e.g., the first terminal or the second terminal) may be configured to randomly select a plurality of $N_{ID}(s)$ from the $N_{ID}$ list, and may use the selected $N_{ID}(s)$.

Scheme #2 (S710/S720)

The base station may configure $N_{ID}$ (e.g., different $N_{ID}$) according to a resource allocation (RA) mode, and transmit the configured $N_{ID}$ using MIB, SIB, and/or RRC message. The $N_{ID}$ may be configured as shown in Table 4 below.

TABLE 4

| | $N_{ID}$ values |
|---|---|
| RA mode #1 | First value, Second value |
| RA mode #2 | Third value, Fourth value |

One or more $N_{ID}(s)$ for each RA mode may be configured. For example, for the RA mode #1, $N_{ID}$ having a first value and $N_{ID}$ having a second value may be configured. For the RA mode #2, $N_{ID}$ having a third value and MD having a fourth value may be configured. The base station may be configured to transmit an RA mode #1-$N_{ID}$ list (e.g., {first value, second value}) and/or an RA mode #2-$N_{ID}$ list (e.g., {third value, fourth value}) to the terminal(s).

The resource allocation scheme according to the RA mode #1 may be different from the resource allocation scheme according to the RA mode #2. For example, when the RA mode #1 is used, the terminal(s) may be configured to perform sidelink communication using resources allocated by the base station. When the RA mode #2 is used, the terminal(s) may be configured to perform sidelink communication using autonomously selected resources without resource allocation by the base station.

The order of the $N_{ID}(s)$ (e.g., $N_{ID}$ values) included in the RA mode #1-$N_{ID}$ list or the RA mode #2-$N_{ID}$ list may refer to the order of using the $N_{ID}(s)$ in the corresponding terminal. For example, when the RA mode #1-$N_{ID}$ list is set to {first value, second value}, the terminal (e.g., the first terminal or the second terminal) may use $N_{ID}$ having the first value to generate a DMRS sequence, and then, may use $N_{ID}$ having the second value to generate a DMRS sequence. Alternatively, the terminal (e.g., the first terminal or the second terminal) may randomly select a plurality of values (e.g., a $N_{ID}(s)$) from the RA mode #1-$N_{ID}$ list or the RA mode #2-$N_{ID}$ list, and use the selected values.

When a PSCCH decoding operation (e.g., SCI decoding operation) using the DMRS according to the first value or the second value is successful, the terminal(s) may be configured to determine that the RA mode #1 is used. When a PSCCH decoding operation (e.g., SCI decoding operation) using the DMRS according to the third value or the fourth value is successful, the terminal(s) may be configured to determine that the RA mode #2 is used. In other words, $N_{ID}$ may be used to indicate the RA mode used for sidelink communication.

Scheme #3 (S710/S720)

The base station may configure $N_{ID}$ (e.g., different $N_{ID}$) according to a cast type, and may transmit the configured $N_{ID}$ using MIB, SIB, and/or RRC message. The cast types may be classified into broadcast, groupcast, and unicast. The $N_{ID}$ may be configured as shown in Table 5 below.

TABLE 5

| | $N_{ID}$ values |
|---|---|
| Broadcast | First value, Second value |
| Groupcast | Third value, Fourth value |
| Unicast | Fifth value, Sixth value |

One or more $N_{ID}(s)$ for each cast type may be configured. For example, for broadcast, $N_{ID}$ having a first value and $N_{ID}$ having a second value may be configured. For groupcast, $N_{ID}$ having a third value and $N_{ID}$ having a fourth value may be configured. For unicast, $N_{ID}$ having a fifth value and $N_{ID}$ having a sixth value may be configured. The base station may be configured to transmit a broadcast-$N_{ID}$ list (e.g., {first value, second value}), a groupcast-$N_{ID}$ list (e.g., {third value, fourth value}), and/or a unicast-$N_{ID}$ list (e.g., {fifth value, sixth value}) to the terminal(s).

The order of the $N_{ID}(s)$ (e.g., $N_{ID}$ values) included in the $N_{ID}$ list (e.g., broadcast-$N_{ID}$ list, groupcast-$N_{ID}$ list, unicast-$N_{ID}$ list) may refer to the order of using $N_{ID}(s)$ in the corresponding terminal. For example, when the groupcast-$N_{ID}$ list is set to {third value, fourth value}, the terminal (e.g., the first terminal or the second terminal) may use $N_{ID}$ having the third value to generate a DMRS sequence and then, may use $N_{ID}$ having the third value to generate a DMRS sequence. Alternatively, the terminal (e.g., the first terminal or the second terminal) may be configured to randomly select a plurality of values (e.g., a plurality of $N_{ID}$ values) in the $N_{ID}$ list (e.g., broadcast-$N_{ID}$ list, groupcast-$N_{ID}$ list, unicast-$N_{ID}$ list), and use the values.

When a PSCCH decoding operation (e.g., SCI decoding operation) using the DMRS according to the first value or the second value is successful, the terminal(s) may be configured to determine that the broadcast scheme is used. When a PSCCH decoding operation (e.g., SCI decoding operation) using the DMRS according to the third value or the fourth value is successful, the terminal(s) may be configured to determine that the groupcast scheme is used. When a PSCCH decoding operation (e.g., SCI decoding operation) using the DMRS according to the fifth value or the sixth value is successful, the terminal(s) may be configured to determine that the unicast scheme is used. In other words, $N_{ID}$ may be used to indicate a cast type used for sidelink communication.

Scheme #4 (S710/S720)

The base station may configure $N_{ID}$ (e.g., different $N_{ID}$) according to a resource pool, and may transmit the configured $N_{ID}$ using MIB, SIB, and/or RRC message. When two resource pools are configured in the terminal(s), $N_{ID}$ may be configured as shown in Table 6 below.

TABLE 6

| | $N_{ID}$ values |
|---|---|
| Resource pool #1 | First value, Second value |
| Resource pool #2 | Third value, Fourth value |

One or more $N_{ID}(s)$ for each resource pool may be configured. For example, for a resource pool #1, $N_{ID}$ having a first value and $N_{ID}$ having a second value may be configured. For a resource pool #2, $N_{ID}$ having a third value and $N_{ID}$ having a fourth value may be configured. The base station may be configured to transmit a resource pool #1-$N_{ID}$ list (e.g., {first value, second value}) and/or a resource pool #2-$N_{ID}$ list (e.g., {third value, fourth value}) to the terminal(s).

The order of the $N_{ID}(S)$ (e.g., $N_{ID}$ values) included in the $N_{ID}$ list (e.g., resource pool #1-$N_{ID}$ list, resource pool #2-$N_{ID}$ list) may refer to the order of using the $N_{ID}(s)$ in the corresponding terminal. For example, when the resource pool #2-$N_{ID}$ list is set to {third value, fourth value}, the terminal (e.g., the first terminal or the second terminal) may use $N_{ID}$ having the third value to generate a DMRS sequence, and then, may use $N_{ID}$ having the third value to generate a DMRS sequence. Alternatively, the terminal (e.g., the first terminal or the second terminal) may be configured to randomly select a plurality of values (e.g., a plurality of $N_{ID}$ values) in the $N_{ID}$ list (e.g., resource pool #1-$N_{ID}$ list, resource pool #2-$N_{ID}$ list), and use the selected values.

Further, $N_1s(s)$ for each of one or more resource pools may be configured. The resource pool defined in Table 6 may be interpreted as a transmission (Tx) resource pool or a reception (Rx) resource pool. Even when a resource pool is configured without distinction between transmission and reception, the resource pool and $N_{ID}$ defined in Table 6 may be used. When a resource pool is interpreted as a transmission resource pool, the configuration information defined in Table 6 (e.g., $N_{ID}$ for the resource pool) may be configuration information transmitted to a transmitting terminal. When a resource pool is interpreted as a reception resource pool, the configuration information defined in Table 6 (e.g., $N_{ID}$ for the resource pool) may be configuration information transmitted to a receiving terminal.

When a resource pool is configured without distinction between transmission and reception, the configuration information (e.g., $N_{ID}$ for the resource pool) defined in Table 6 may be transmitted to a transmitting terminal and/or a receiving terminal. For example, the transmitting terminal may be configured to generate a DMRS using the configuration information defined in Table 6, and may be configured to transmit the generated DMRS and a PSCCH (or PSSCH). The receiving terminal may be configured to detect a DMRS using the configuration information defined in Table 6, and may perform a PSCCH decoding operation (or, PSSCH decoding operation) using the detected DMRS. In exemplary embodiments, a resource pool may be a transmission resource pool, a reception resource pool, or a resource pool without distinction of transmission and reception. The configuration information defined in Table 6 may be applied to the resource pool.

Scheme #5 (S710/S720)

The base station may configure $N_{ID}$ (e.g., different $N_{ID}$) according to a resource pool, and may transmit the configured $N_{ID}$ using MIB, SIB, and/or RRC message. $N_{ID}$ may be configured as shown in Table 7 below. When a reception resource pool and a transmission resource pool are configured in the terminal(s), $N_{ID}$ may be configured as shown in Table 7 below.

TABLE 7

| | $N_{ID}$ values |
|---|---|
| TX resource pool | First value, Second value |
| RX resource pool | Third value, Fourth value, Fifth value, Sixth value |

One or more $N_{ID}(s)$ for each resource pool may be configured. For example, for a transmission resource pool, $N_{ID}$ having a first value and $N_{ID}$ having a second value may be configured. For a reception resource pool, $N_{ID}$ having a third value, $N_{ID}$ having a fourth value, $N_{ID}$ having a fifth value, and $N_{ID}$ having a sixth value may be configured. The base station may be configured to transmit a transmission resource pool-$N_{ID}$ list (e.g., {first value, second value}) and/or a reception resource pool-$N_{ID}$ list (e.g., {third value, fourth value, fifth value, sixth value}) to the terminal(s).

The order of the $N_{ID}(s)$ (e.g., $N_{ID}$ values) included in the $N_{ID}$ list (e.g., transmission resource pool-$N_{ID}$ list, reception resource pool-$N_{ID}$ list) may refer to the order of using $N_{ID}(s)$ in the corresponding terminal. For example, when the transmission resource pool-$N_{ID}$ list is set to {first value, second value}, the terminal (e.g., the first terminal or the second terminal) may use $N_{ID}$ having the first value to generate a DMRS sequence, and then, may use $N_{ID}$ having the second value to generate a DMRS sequence. Alternatively, the terminal (e.g., the first terminal or the second terminal) may be configured to randomly select a plurality of values (e.g., a plurality of $N_{ID}$ values) in the $N_{ID}$ list (e.g., transmission resource pool-$N_{ID}$ list, reception resource pool-$N_{ID}$ list), and use the selected values.

When a plurality of transmission resource pools are configured, $N_{ID}(s)$ for each of the plurality of transmission resource pools may be configured as shown in Table 7. When a plurality of reception resource pools are configured, $N_{ID}(s)$ for each of the plurality of reception resource pools may be configured as shown in Table 7.

Scheme #6 (S710/S720)

The base station may configure two resource pools (e.g., resource pool #1 and resource pool #2) to the terminal(s). In addition, the base station may be configured to inform the terminal(s) of configuration information of time-frequency resources for each of the resource pools through one or a combination of two or more among higher layer signaling, MAC signaling, and PHY signaling. The configuration information of the time-frequency resources may include a start symbol index (or start slot index) of a time resource region, an end symbol index (or end slot index) of the time-resource region, a length of the time resource region, a start physical resource block (PRB) index (or start subcarrier index) of a frequency resource region, an end PRB index (or end subcarrier index) of the frequency resource region, and/or a size of the frequency resource region. In particular, the PRB may be interpreted as a common resource block (CRB). The time-frequency resource(s) for each of the resource pools may be configured as shown in Table 8 below.

TABLE 8

| | Time-frequency resources |
|---|---|
| Resource pool #1 | Time-frequency resource #1 |
| | Time-frequency resource #2 |
| Resource pool #2 | Time-frequency resource #3 |
| | Time-frequency resource #4 |

The terminal(s) may be configured to determine $N_{ID}$ based on the configuration information of the time-frequency resources, which is received from the base station. For example, the terminal(s) may be configured to calculate $N_{ID}$ for the corresponding resource pool by inputting the configuration information of the time-frequency resources into an equation (e.g., function). The $N_{ID}$ for the resource pool #1 may be calculated based on '$N_{ID}$=function (configuration information of the time-frequency resource #1, configuration information of the time-frequency resource #2)'. In particular, the time-frequency resource #1 may be interpreted as a time domain resource, and the time-frequency resource #2 may be interpreted as a frequency domain resource. The $N_{ID}$ for the resource pool #2 may be calculated based on '$N_{ID}$=function (configuration information of the time-frequency resource #3, configuration information of the time-frequency resource #4)'. The time-frequency resource #3 may be interpreted as a time domain resource, and the time-frequency resource #4 may be interpreted as a frequency domain resource. Based on the above-described equation (e.g., function), one or more $N_{ID}(s)$ for one resource pool may be calculated.

Scheme #7 (S710/S720)

The base station may configure two resource pools (e.g., resource pool #1 and resource pool #2), and may set the number (e.g., the maximum number) of $N_{ID}(s)$ for each of the resource pools. The base station may be configured to inform the terminal(s) of configuration information of the time-frequency resources and information indicating the number (e.g., the maximum number) of $N_{ID}(s)$ for each of the resource pools through one or a combination of two or more among higher layer signaling, MAC signaling, and PHY signaling. The configuration information of the time-frequency resources may include a start symbol index (or start slot index) of a time-resource region, an end symbol index (or end slot index) of the time-resource region, a length of the time resource region, a start PRB index (or start subcarrier index) of a frequency resource region, an end PRB index (or end subcarrier index) of the frequency resource region, and/or a size of the frequency resource region. The time-frequency resource(s) and the number of $N_{ID}(s)$ for each of the resource pools may be configured as shown in Table 9 below.

TABLE 9

|  | Time-frequency resources | Number (e.g., max number) of $N_{ID}(s)$ |
|---|---|---|
| Resource pool #1 | Time-frequency resource #1<br>Time-frequency resource #2 | 2 |
| Resource pool #2 | Time-frequency resource #3<br>Time-frequency resource #4 | 4 |

The terminal(s) may be configured to calculate $N_{ID}$ using the equation defined in the scheme #6 described above, and calculate additional $N_{ID}(s)$ by inputting the $N_{ID}$ into another equation (e.g., another function). To calculate two $N_{ID}(s)$ for the resource pool #1, the terminal(s) may use '$N_{ID}$ #1=function(configuration information of the time-frequency resource #1, configuration information of the time-frequency resource #2)' to calculate $N_{ID}$ #1, and use '$N_{ID}$ #2=function ($N_{ID}$ #1)' to calculate $N_{ID}$ #2. The function used to calculate $N_{ID}$ #1 may be the same as the function used to calculate $N_{ID}$ #2. Alternatively, the function used to calculate $N_{ID}$ #1 may be different from the function used to calculate $N_{ID}$ #2. The input(s) of the above-described function(s) may be configuration information of the time-frequency resources, a previously calculated $N_{ID}$ (e.g., $N_{ID}$ #1), and/or other information.

The number (e.g., maximum number) of $N_{ID}(s)$ for each of the resource pools may be set differently. A common $N_{ID}$ (or the number of common $N_{ID}(s)$) for resource pools may be set. In the communication system, the common $N_{ID}$ (or, the number of common $N_{ID}(s)$) may be set to a fixed value. In particular, the terminal(s) may operate without information on the number of $N_{ID}(s)$ defined in Table 9.

Scheme #8 (S710/S720)

In a scheme #8, a plurality of DMRSs (e.g., a plurality of DMRS sequences) may be generated based on cyclic shift values. To support this operation, a cyclic shift value(s) for each of the resource pools may be configured. For example, the base station may configure two resource pools (e.g., resource pool #1 and resource pool #2), and may configure cyclic shift value(s) for each of the resource pools. The base station may be configured to inform the terminal(s) of configuration information of time-frequency resources and information indicating the cyclic shift value(s) for each of the resource pools through one or a combination of two or more among higher layer signaling, MAC signaling, and PHY signaling. The configuration information of the time-frequency resources may include a start symbol index (or start slot index) of a time-resource region, an end symbol index (or end slot index) of the time-resource region, a length of the time resource region, a start PRB index (or start subcarrier index) of a frequency resource region, an end PRB index (or end subcarrier index) of the frequency resource region, and/or a size of the frequency resource region. The time-frequency resource(s) and cyclic shift value(s) for each of the resource pools may be configured as shown in Table 10 below.

TABLE 10

|  | Time-frequency resources | Cyclic shift values |
|---|---|---|
| Resource pool #1 | Time-frequency resource #1<br>Time-frequency resource #2 | 6 |
| Resource pool #2 | Time-frequency resource #3<br>Time-frequency resource #4 | 6, 12, 18 |

The terminal(s) may be configured to calculate $N_{ID}$ using the equation defined in the above-described scheme #6, generate a DMRS sequence based on the $N_{ID}$, and generate additional DMRS sequence(s) by applying cyclic shift value(s) to the DMRS sequence. To calculate DMRS sequence(s) for the resource pool #1, the terminal(s) may use '$N_{ID}$=function (configuration information of the time-frequency resource #1, configuration information of the time-frequency resource #2)' to calculate $N_{ID}$, and may be configured to generate a DMRS sequence #1 based on the $N_{ID}$. The terminal(s) may be configured to generate a DIVERS sequence #2 by applying a cyclic shift value (e.g., 6) to the DMRS sequence #1. The DMRS sequence #1 may be a base sequence of the DMRS sequence #2. Without calculating an additional $N_{ID}$, an additional DMRS sequence (e.g., DMRS sequence #2) may be generated.

When a plurality of cyclic shift values are configured for one resource pool, the order of the plurality of cyclic shift values included in a cyclic shift list may mean an order of using the cyclic shift values in the corresponding terminal. When the cyclic shift list is set to {6, 12, 18}, the terminal(s) may be configured to generate a first additional DMRS sequence by using a cycle shift 6, generate a second additional DMRS sequence by using a cyclic shift 12, and generate a third additional DMRS sequence by using a cyclic shift 18. Alternatively, the terminal(s) may be configured to randomly select the cyclic shift value(s) from the cyclic shift list, and generate additional DMRS sequence(s) using the selected cyclic shift value(s).

The number of cyclic shift values configured for each of the resource pools may implicitly indicate the number of DMRS sequences usable in the corresponding resource pool. For example, when one cyclic shift value is configured for the resource pool #1, two DMRS sequences may be used in the resource pool #1. When three cyclic shift values are configured for the resource pool #2, four DMRS sequences may be used in the resource pool #2.

Different cyclic shift values may be configured for each of the resource pools. Alternatively, a common cyclic shift value for resource pools may be used in the communication system. The common cyclic shift value may be a cell-specific value or a UE-specific value. The common cyclic shift value may be transmitted to the terminal(s) through one or a combination of two or more among higher layer signaling, MAC signaling, and PHY signaling.

Scheme #9 (S710/S720)

$N_{ID}$ may be classified into a pre-configured ID and a configured ID. The preconfigured IDs and the configured ID may be as shown in Table 11 below.

TABLE 11

| ID type | Transmission scheme | $N_{ID}$ |
| --- | --- | --- |
| Preconfigured ID | MIB, SIB, RRC, MAC-CE | $N_{ID}$ #1 |
| Configured ID | RRC, MAC-CE | $N_{ID}$ #2 |

The preconfigured ID may be transmitted through one or a combination of two or more among MIB, SIB, RRC message, and MAC-CE. $N_{ID}$ #1, which is a preconfigured ID, may be a fixed value in the communication system. Alternatively, $N_{ID}$#1 may be a cell-specific value. The configured ID may be transmitted through one or a combination of two or more among RRC and MAC-CE. $N_{ID}$ #2, which is a configured ID, may be a resource-specific value, a resource pool-specific value, a UE-specific value, a cast type-specific value, and/or an RA mode-specific value.

The preconfigured ID (e.g., $N_{ID}$ #1) and the configured ID (e.g., $N_{ID}$ #2) may be transmitted to the terminal(s). In this case, the terminal(s) may be configured to calculate $N_{ID}$ by inputting the preconfigured ID and the configured ID into an equation (e.g., function). For example, the terminal may be configured to calculate $N_{ID}$ using '$N_{ID}$=function ($N_{ID}$ #1, $N_{ID}$ #2)' and may generate a DMRS sequence using the calculated $N_{ID}$.

One or more preconfigured IDs may be used, and one or more configured IDs may be used. In particular, a plurality of $N_{ID}$(s) may be generated based on the one or more preconfigured IDs and the one or more configured IDs. In Table 12 below, two configured IDs may be configured.

TABLE 12

| ID type | Transmission scheme | $N_{ID}$ |
| --- | --- | --- |
| Preconfigured ID | MIB, SIB, RRC, MAC-CE | $N_{ID}$ #1 |
| Configured ID | RRC, MAC-CE | $N_{ID}$ #2, $N_{ID}$ #3 |

The terminal(s) may be configured to calculate two $N_{ID}$(s) using a function ($N_{ID}$ #1, $N_{ID}$ #2) and a function ($N_{ID}$ #1, $N_{ID}$ #3), and may generate two DMRS sequences using the two $N_{ID}$(s). When a plurality of preconfigured IDs are configured, the order of the plurality of preconfigured IDs included in a preconfigured ID list may refer to the order of using the preconfigured IDs in the corresponding terminal. When a plurality of configured IDs are configured, the order of the plurality of configured IDs included in a configured ID list may refer to the order of using the configured IDs in the corresponding terminal. In particular, the terminal(s) may be configured to generate DMRS sequences by using the preconfigured IDs and/or the configured IDs according to the order of use.

In the exemplary embodiments according to Table 12, the terminal(s) may be configured to calculate a plurality of $N_{ID}$(s) based on the plurality of IDs (e.g., preconfigured ID(s) and/or configured ID(s)) by using the same equation (e.g., function). In the exemplary embodiments according to Table 11, the use of the plurality of equations may be negotiated between a first terminal (e.g., transmitting terminal) and a second terminal (e.g., receiving terminal), and the terminal(s) may be configured to calculate the plurality of $N_{ID}$(s) by using the plurality of equations. Alternatively, when one $N_{ID}$ is calculated in the exemplary embodiments according to Table 11, the terminal(s) may be configured to generate a base sequence based on the corresponding $N_{ID}$, and generate an additional DMRS sequence by applying a cyclic shift value (e.g., cyclic shift value defined in Table 10) to the base sequence.

In the exemplary embodiment according to Table 12, when a preconfigured ID is received but no configured ID is received, the terminal(s) may be configured to calculate $N_{ID}$ based on the preconfigured ID, and may generate a DMRS sequence using the $N_{ID}$. In particular, since the first terminal (e.g., transmitting terminal) and the second terminal (e.g., receiving terminal) know in advance the equation for calculating $N_{ID}$, the $N_{ID}$ may be calculated at the terminal(s). Additional equation(s) may be used to calculate a plurality of $N_{ID}$(s). Alternatively, a base sequence may be generated based on a single $N_{ID}$, and an additional DMRS sequence may be generated by applying a cyclic shift value (e.g., cyclic shift value defined in Table 10) to the base sequence.

When the above-described schemes #1 to #9 are used, $N_{ID}$ may not be configured in the terminal by higher layer signaling. In particular, the terminal(s) may use $N_{ID}$ preconfigured in the communication system as a default value. One or more $N_{ID}$(s) may be preconfigured in the communication system. Like the scheme #7, a function for generating an additional $N_{ID}$ may be extended and applied. Like the scheme #8, a cyclic shift value for generating an additional DMRS sequence may be extended and applied. Two or more of the above-described schemes #1 to #9 may be simply combined, partially combined, or extendedly combined, and the combined schemes may be used.

Referring back to FIG. 7, the first terminal may be a transmitting terminal, and the second terminal may be a receiving terminal. After the step S720, the first terminal may be configured to calculate an initial value (i.e., $c_{init}$) of a pseudo-random sequence by inputting $N_{ID}$ (e.g., DMRS scrambling identifier) into Equation 1 below (S730). The $N_{ID}$ may have a value set by the base station or a value calculated by the first terminal.

$$c_{init} = (2^{17}(N_{symb}^{slot} n_{s,f}^\mu + l + 1)(2N_{ID}+1)+2N_{ID}) \bmod 2^{31} \quad \text{Equation 1}$$

wherein $N_{symb}^{slot}$ may indicate the number of symbols in a slot, $n_{s,f}^\mu$ may indicate a slot number within a frame, and l may indicate an OFDM symbol number in the slot.

The first terminal may be configured to generate a DMRS sequence $r_l(m)$ by inputting the initial value $c_{init}$ of the pseudo-random sequence into Equation 2 below (S740). The DMRS sequence generated by Equation 2 may be a PSCCH DMRS. In other words, the PSCCH DMRS may be generated based on the DMRS sequence.

$$r_l(m) = \frac{1}{\sqrt{2}}(1 - 2c(2\,m)) + j\frac{1}{\sqrt{2}}(1 - 2c(2\,m+1)) \quad \text{Equation 2}$$

The first terminal may be configured to transmit an SCI and the PSCCH DMRS to the second terminal on a PSCCH (S750). The second terminal may be configured to perform a PSCCH DMRS detection operation to obtain the SCI (S760). The PSCCH DMRS detection operation may be performed in a PSCCH monitoring occasion. The second terminal may be configured to generate the PSCCH DMRS based on Equations 1 and 2 described above, and compare the generated PSCCH DMRS (e.g., DMRS sequence) and a reference signal (e.g., sequence of the reference signal) detected in the PSCCH monitoring occasion. When the same reference signal (e.g., the same PSCCH DMRS) as the generated PSCCH DMRS is detected, the second terminal may be configured to determine that the SCI associated with the corresponding PSCCH DMRS is transmitted from the first terminal. In particular, the second terminal may be configured to perform a reception operation (e.g., demodulation operation and decoding operation) for the SCI (S770).

When $N_{ID}$ is configured for each RA mode, the PSCCH DMRS (e.g., DMRS sequence) generated based on the corresponding $N_{ID}$ may indicate a specific RA mode. For example, when a PSCCH DMRS associated with the RA mode #1 is detected, the second terminal may be configured to determine that RA mode #1 is used for the sidelink communication. When $N_{ID}$ is configured for each cast type, the PSCCH DMRS (e.g., DMRS sequence) generated based on the corresponding $N_{ID}$ may indicate a specific cast type. For example, when a PSCCH DMRS corresponding to the groupcast scheme is detected, the second terminal may be configured to determine that sidelink communication is performed using the groupcast scheme. When $N_{ID}$ is configured for each resource pool, the PSCCH DMRS (e.g., DMRS sequence) generated based on the corresponding $N_{ID}$ may indicate a specific resource pool. For example, when a PSCCH DMRS corresponding to a resource pool #1 is detected, the second terminal may be configured to determine that the resource pool #1 is used for sidelink communication.

The exemplary embodiments of the present disclosure may be implemented as program instructions executable by a variety of computers and recorded on a non-transitory computer readable medium. The non-transitory computer readable medium may include a program instruction, a data file, a data structure, or a combination thereof. The program instructions recorded on the non-transitory computer readable medium may be designed and configured specifically for the present disclosure or can be publicly known and available to those who are skilled in the field of computer software.

Examples of the non-transitory computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa. While the embodiments of the present disclosure and their advantages have been described in detail, it should be understood that various changes, substitutions and alterations may be made herein without departing from the scope of the present disclosure.

What is claimed is:

1. An operation method of a first terminal in a communication system, the operation method comprising:
   receiving a message including a first demodulation reference signal (DMRS) scrambling identifier $N_{ID}$ for sidelink communication from a base station;
   calculating a first pseudo-random sequence $c_{init}$ by inputting the first DMRS scrambling identifier $N_{ID}$ into Equation 1;

$$c_{init}=(2^{17}(N_{symb}^{slot}n_{s,f}^{\mu}+l+1)(2N_{ID}+1)+2N_{ID}) \bmod 2^{31} \quad \text{(Equation 1)}$$

calculating a first DMRS sequence $r_l(m)$ by inputting the first pseudo-random sequence $c_{init}$ into Equation 2; and $$r_l(m) = \frac{1}{\sqrt{2}}(1 - 2c(2\ m)) + j\frac{1}{\sqrt{2}}(1 - 2c(2\ m + 1)) \quad \text{(Equation 2)}$$

transmitting sidelink control information (SCI) and a first DMRS generated based on the first DMRS sequence $r_l(m)$ to a second terminal through a physical sidelink control channel (PSCCH),
   wherein $N_{symb}^{slot}$ denotes a number of symbols in a slot, $n_{s,f}^{\mu}$ denotes a slot number in a frame, and l denotes a symbol number in the slot.

2. The operation method according to claim 1, wherein the message includes an identifier list, the identifier list includes the first DMRS scrambling identifier and a second DMRS scrambling identifier, the first DMRS scrambling identifier is used to generate the first DMRS sequence, and the second DMRS scrambling identifier is used to generate a second DMRS sequence.

3. The operation method according to claim 2, wherein an order of the DMRS scrambling identifiers included in the identifier list is an order of using the DMRS scrambling identifiers.

4. The operation method according to claim 1, wherein the message includes an identifier list, the identifier list includes the first DMRS scrambling identifier and a second DMRS scrambling identifier, the first DMRS scrambling identifier is used when a resource allocation (RA) scheme #1 is used for the sidelink communication, and the second DMRS scrambling identifier is used when an RA scheme #2 is used for the sidelink communication.

5. The operation method according to claim 1, wherein the message includes an identifier list, the identifier list includes the first DMRS scrambling identifier, a second DMRS scrambling identifier, and a third DMRS scrambling identifier, the first DMRS scrambling identifier is used when the sidelink communication is performed based on a cast type #1, the second DMRS scrambling identifier is used when the sidelink communication is performed based on a cast type #2, the third DMRS scrambling identifier is used when the sidelink communication is performed based on a cast type #3, and the case type #1, the cast type #2, and the cast type #3 are broadcast, groupcast, and unicast, respectively.

6. The operation method according to claim 1, wherein the message includes an identifier list, the identifier list includes the first DMRS scrambling identifier and a second DMRS scrambling identifier, the first DMRS scrambling identifier is used when a resource pool #1 is used for the sidelink communication, and the second DMRS scrambling identifier is used when a resource pool #2 is used for the sidelink communication.

7. The operation method according to claim 6, wherein the message further includes information indicating a number of DMRS scrambling identifiers available for the resource pool #1 and information indicating a number of DMRS scrambling identifiers available for the resource pool #2.

8. The operation method according to claim 6, wherein the message further includes a first cyclic shift value configured for the resource pool #1 and a second cyclic shift value configured for the resource pool #2.

9. The operation method according to claim 8, wherein an additional DMRS sequence for the resource pool #1 is generated by applying the first cyclic shift value to the first DMRS sequence.

10. An operation method of a second terminal in a communication system, the operation method comprising:
    receiving a message including a first demodulation reference signal (DMRS) scrambling identifier for sidelink communication from a base station;
    performing a monitoring operation on a physical sidelink control channel (PSCCH) to obtain sidelink control information (SCI) from the first terminal;

comparing a sequence of a reference signal detected on the PSCCH with a first DMRS sequence $r_l(m)$ generated based on the first DMRS scrambling identifier; and in response to determining that the sequence of the reference signal is equal to the first DMRS sequence $r_l(m)$, performing a reception operation of the SCI on the PSCCH, wherein the DMRS sequence $r_l(m)$ is generated based on Equation 1;

$$r_l(m) = \frac{1}{\sqrt{2}}(1-2c(2\ m)) + j\frac{1}{\sqrt{2}}(1-2c(2\ m+1)) \quad \text{(Equation 1)}$$

an initialization value $c_{init}$ of $c(\cdot)$ in Equation 1 is generated based on Equation 2; and $$c_{init} = (2^{17}(N_{symb}^{slot}n_{s,f}^{\mu}+l+1)(2N_{ID}+1)+2N_{ID}) \bmod 2^{31} \quad \text{(Equation 2)}$$

$N_{ID}$ denotes the first DMRS scrambling identifier, $N_{symb}^{slot}$ denotes a number of symbols in a slot, $n_{s,f}^{\mu}$ denotes a slot number in a frame, and l denotes a symbol number in the slot.

11. The operation method according to claim 10, wherein the message includes an identifier list, the identifier list includes the first DMRS scrambling identifier and a second DMRS scrambling identifier, the first DMRS scrambling identifier is used to generate the first DMRS sequence, and the second DMRS scrambling identifier is used to generate a second DMRS sequence.

12. The operation method according to claim 10, wherein in response to determining that first DMRS scrambling identifier is configured for a resource allocation (RA) scheme #1 among the RA scheme #1 and an RA scheme #2, and the first DMRS sequence $r_l(m)$ generated based on the first DMRS scrambling identifier is equal to the sequence of the reference signal, the RA scheme #1 is determined to be used for the sidelink communication.

13. The operation method according to claim 10, wherein in response to determining that first DMRS scrambling identifier is configured for a cast type #1 among the cast type #1, a cast type #2, and a cast type #3, and the first DMRS sequence $r_l(m)$ generated based on the first DMRS scrambling identifier is equal to the sequence of the reference signal, the sidelink communication is determined to be performed based on the cast type #1, and the case type #1, the cast type #2, and the cast type #3 are broadcast, groupcast, and unicast, respectively.

14. The operation method according to claim 10, wherein in response to determining that first DMRS scrambling identifier is configured for a resource pool #1 among the resource pool #1 and a resource pool #2, and the first DMRS sequence $r_l(m)$ generated based on the first DMRS scrambling identifier is equal to the sequence of the reference signal, the sidelink communication is determined to be performed using the resource pool #1.

15. The operation method according to claim 14, wherein the message further includes information indicating a number of DMRS scrambling identifiers available for the resource pool #1 and information indicating a number of DMRS scrambling identifiers available for the resource pool #2.

16. A first terminal in a communication system comprising:

a processor; and a memory storing at least one instruction executable by the processor, wherein the at least one instruction causes the first terminal to:

receive a message including a first demodulation reference signal (DMRS) scrambling identifier $N_{ID}$ for sidelink communication from a base station;

calculate a first pseudo-random sequence $c_{init}$ by inputting the first DMRS scrambling identifier $N_{ID}$ into Equation 1;

$$c_{init} = (2^{17}(N_{symb}^{slot}n_{s,f}^{\mu}+l+1)(2N_{ID}+1)+2N_{ID}) \bmod 2^{31} \quad \text{(Equation 1)}$$

calculate a first DMRS sequence $r_l(m)$ by inputting the first pseudo-random sequence $c_{init}$ into Equation 2; and $$r_l(m) = \frac{1}{\sqrt{2}}(1-2c(2\ m)) + j\frac{1}{\sqrt{2}}(1-2c(2\ m+1)) \quad \text{(Equation 2)}$$

transmit sidelink control information (SCI) and a first DMRS generated based on the first DMRS sequence $r_l(m)$ to a second terminal through a physical sidelink control channel (PSCCH), wherein $N_{symb}^{slot}$ denotes a number of symbols in a slot, $n_{s,f}^{\mu}$ denotes a slot number in a frame, and l denotes a symbol number in the slot.

17. The first terminal according to claim 16, wherein the message includes an identifier list, the identifier list includes the first DMRS scrambling identifier and a second DMRS scrambling identifier, the first DMRS scrambling identifier is used to generate the first DMRS sequence, and the second DMRS scrambling identifier is used to generate a second DMRS sequence.

18. The first terminal according to claim 16, wherein the message includes an identifier list, the identifier list includes the first DMRS scrambling identifier and a second DMRS scrambling identifier, the first DMRS scrambling identifier is used when a resource allocation (RA) scheme #1 is used for the sidelink communication, and the second DMRS scrambling identifier is used when an RA scheme #2 is used for the sidelink communication.

19. The first terminal according to claim 16, wherein the message includes an identifier list, the identifier list includes the first DMRS scrambling identifier, a second DMRS scrambling identifier, and a third DMRS scrambling identifier, the first DMRS scrambling identifier is used when the sidelink communication is performed based on a cast type #1, the second DMRS scrambling identifier is used when the sidelink communication is performed based on a cast type #2, the third DMRS scrambling identifier is used when the sidelink communication is performed based on a cast type #3, and the case type #1, the cast type #2, and the cast type #3 are broadcast, groupcast, and unicast, respectively.

20. The first terminal according to claim 16, wherein the message includes an identifier list, the identifier list includes the first DMRS scrambling identifier and a second DMRS scrambling identifier, the first DMRS scrambling identifier is used when a resource pool #1 is used for the sidelink communication, and the second DMRS scrambling identifier is used when a resource pool #2 is used for the sidelink communication.

* * * * *